United States Patent [19]

Shiohata et al.

[11] Patent Number: 4,489,606
[45] Date of Patent: Dec. 25, 1984

[54] METHOD OF AND SYSTEM FOR BALANCING A ROTOR

[75] Inventors: Kouki Shiohata, Ibaraki; Fumio Fujisawa, Mito; Takashi Watanabe; Yasumasa Ishibashi, both of Hitachi, all of Japan

[73] Assignee: Hitachi, Ltd., Tokyo, Japan

[21] Appl. No.: 401,720

[22] Filed: Jul. 26, 1982

[30] Foreign Application Priority Data

Jul. 27, 1981 [JP] Japan .................................. 56-116342

[51] Int. Cl.$^3$ ............................................. G01M 1/22
[52] U.S. Cl. ...................................... 73/462; 364/463
[58] Field of Search .................... 73/66, 462; 364/463, 364/508

[56] References Cited

U.S. PATENT DOCUMENTS 4,098,127 7/1978 Shiga et al. ........................... 73/462

Primary Examiner—James J. Gill
Attorney, Agent, or Firm—Antonelli, Terry & Wands

[57] ABSTRACT

A method of and a system for reducing an excessive amplitude of unbalance vibration occurring in a rotor by actually measuring and comparing the unbalance vibration amplitude of the rotor with a desired level for judgement as to whether the desired value is exceeded, selecting a certain correction plane combination in accordance with the measured unbalance vibration amplitude. A correction mass to be added to the rotor is calculated using an influence coefficient corresponding to the selected correction plane combination, assuming that the correction mass is added to the rotor, estimated residual vibration amplitudes and root mean squares thereof are calculated at respective correction plane position combinations each having at least any two of positions of a plurality of correction planes on the rotor.

16 Claims, 10 Drawing Figures

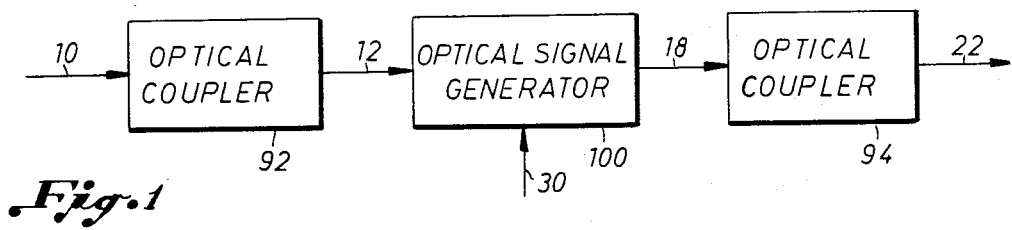
Fig.1
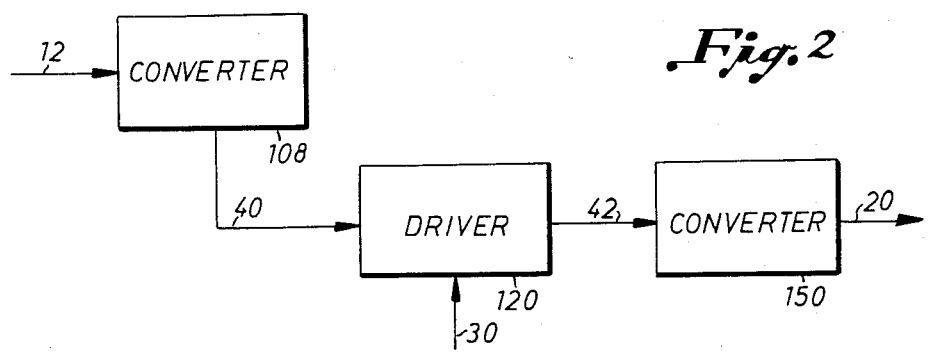
Fig.2
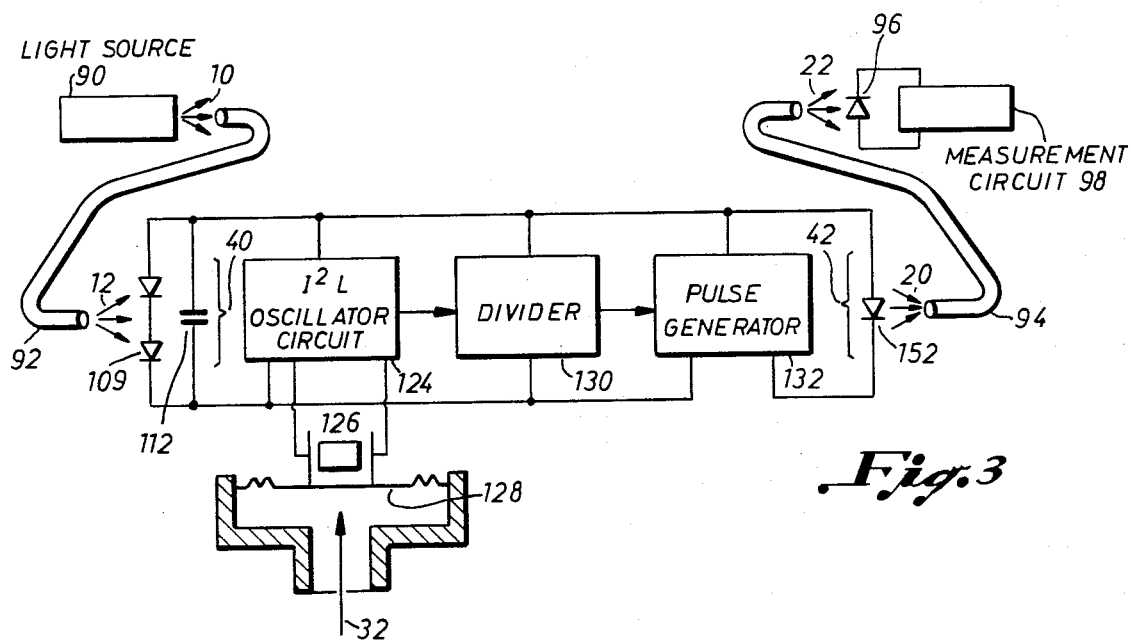
Fig.3
Fig.4
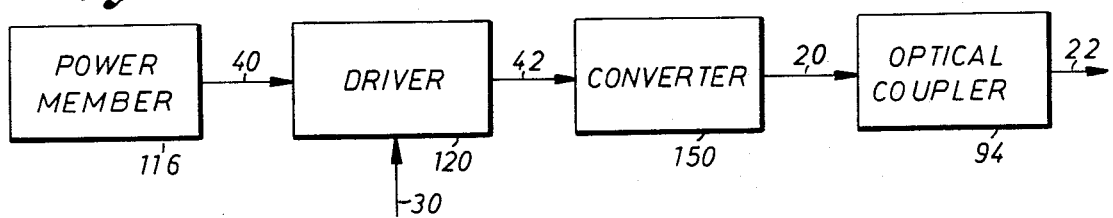

METHOD OF AND SYSTEM FOR BALANCING A ROTOR

BACKGROUND OF THE INVENTION

The present invention relates to a rotor balancing method and system for reducing the amplitude of excessive vibration occuring in a rotor system of a rotary machine.

In general, it is quite difficult to produce the rotor of a rotary machine in perfect symmetry around a longitudinal axis of the rotor. Accordingly, the rotor often has mass unbalance. As the rotor having such mass unbalance is rotated, the mass unbalance causes a centrifugal force to act on the rotor to cause an unbalance vibration to occur. The presence of considerable mass unbalance in the rotor causes an excessive vibration thereof and, the excessive vibration results in an abnormality of the bearings by which the rotor is rotatably supported thereby resulting in a failure of normal operation of the rotor.

It will be understood from the foregoing that, in the rotary machines having rotors, it is quite important to avoid any accident attributable to the rotor vibration, to thereby improve the reliability of the rotary machine and to ensure the safety thereof. From this point of view, it is a matter of great significance to accurately and efficiently perform the rotor balancing which is the technique for reducing the vibration amplitude.

Generally, the results of the rotor balancing are evaluated by whether the vibration amplitude has reduced below a predetermined allowable level. Hitherto, various rotor balancing techniques have been used depending on the type of the rotor and the speed range of operation of the rotor. Usually, however, the rotor balanicing is made by adding a correction mass to the rotor to reduce the vibration amplitude. The term "correction mass" is used here to mean a vector mass having concepts of angle and magnitude. More specifically, the "correction mass" is the vector mass defined as having a circumferential angular position to which a correction mass is to be added, and the correction mass. Therefore, in the conventional rotor balancing technique, it is a key for reducing the vibration amplitude to adequately select the correction mass, and to choose an optimum correction plane to which the mass is to be added, from a plurality of axially-spaced correction planes which exist lengthwise of the rotor. The selection of optimum correction mass and the optimum choice of the optimum correction plane are generally difficult and time-consuming and, accordingly, seriously hinders the quickness and accuracy of the rotor balancing.

The choice of the correction plane in the conventional rotor balancing largely relies upon the high experience and knowledge of the skilled operator, so that the choice takes an impractically long time to impose a serious problem from the view point of quickness of the operation. More specifically, the mass unbalance on the rotor is optionally distributed along the length of the rotor. In addition, in most cases, the correction plane to which the correction mass is to be added can take a plurality of positions extending lengthwise. In the conventional rotor balancing, however, the choice and determination of the correction plane have been made by skilled operators having good experience and knowledge, taking into account various factors such as vibration mode of rotor. Operators having good experience will be able to determine the optimum correction plane in a short period of time, if only few correction planes exist. However, if he is not experienced enough, he will have to determine the correction plane through a trial-and-error method taking a long time even if the number of conceivable correction planes is small. In the case where a plurality of correction planes exist along the length of the rotor and enormous data have to be taken into consideration for the reduction of vibration amplitude, as in the case of the rotor of a turbine generator, it is quite difficult to determine the optimum correction plane in a short time, not only for unskilled operators but also the operators who have abundant experience and knowledge.

U.S. Pat. No. 4,098,127 discloses a process for determining the correction mass to be added to the correction plane on the basis of enormous data. This process is effective only when the correction plane to which the mass is to be added is designated or given, and cannot apply at all to the determination of correction plane and correction amount in the case where a plurality of correction planes are conceivable.

SUMMARY OF THE INVENTION

An object of the invention is to provide rotor balancing method and system capable of efficiently and accurately reducing the amplitude of vibration of the rotor of a rotary machine.

According to the present invention, there is provided a rotor balancing method for reducing excessive amplitude of unbalance vibration occurring in a rotor of a rotary machine, comprising the steps of: actually measuring an unbalance vibration amplitude of the rotor; judging whether a desired level is exceeded by the actually measured unbalance vibration amplitude; selecting at least one of a plurality of correction planes preset on the rotor, in accordance with the actually measured unbalance vibration amplitude, when the desired level is exceeded; computing a correction mass to be added to the rotor, using one of a plurality of influence coefficients preset to the respective correction planes, corresponding to the at least one selected correction plane; computing, on an assumption that the correction mass is added to the rotor, estimated residual vibration amplitudes and the roots of mean of squares of the estimated residual vibration amplitudes; comparing respective combinations of maximum ones of the estimated residual vibration amplitudes and the roots of means of squares corresponding to the respective correction planes with the desired level, to select, as an appropriate correction plane, the correction plane corresponding to at least one of the combinations which is below the desired level; and actually adding the correction mass to the appropriate correction plane.

According to the present invention, there is also provided a rotor balancing system for reducing excessive amplitude of unbalance vibration ocurring in a rotor of a rotary machine comprising: measuring means for actually measuring the unbalance vibration amplitude of the rotor; judging means for judging whether the actually measured unbalance vibration amplitude exceeds a desired level; first selection means for selecting, when the desired level is exceeded, at least one of a plurality of correction planes preset on the rotor, based on the actually measured unbalance vibration amplitude; first computing means for computing a correction mass to be added to the rotor, using one of a plurality of influence coefficients preset to the respective correction planes, corresponding to the at least one selected correction plane; second computing means for computing, on an assumption that the correction mass is added to the rotor, estimated residual viration amplitudes and the roots of mean of squares of the estimated residual vibration amplitudes; and second selection means for comparing respective combinations of maximum values of the estimated residual vibration amplitudes and the roots of mean of squares of the estimated residual vibration amplitudes corresponding to the respective correction planes with the desired level, to select, as an appropriate correction plane, the correction plane corresponding to at least one of the combination which is below the desired level.

BRIEF DESCRIPTION OF THE DRAWINGS

FIG. 1 is a schematic block diagram of a balancing system in accordance with an embodiment of the invention, applied to a rotor system of a power generating plant;

FIG. 2 is a graph presented on a display device, showing the actually measured unbalance vibration amplitude (solid-line curve) and an estimated vibration amplitude (broken-line curve) obtained on an assumption that an optimum correction mass is applied to the rotor;

FIG. 3 is a graph presented on the display device, showing a desired or allowable level, estimated residual vibration amplitudes, and a root of mean of square of estimated residual vibration amplitudes;

FIG. 4 is a graph presented on the display device, showing a combination of the maximum value of the estimated residual vibration amplitudes and the root of mean of square thereof;

FIG. 5 is a graph presented on the display device and showing the actually measured unbalance vibration amplitude, an estimated residual vibration and a desired or allowable level;

FIG. 6 is a flow chart of the balancing system as shown in FIG. 1;

FIG. 7 is a schematic view showing vibration modes of the rotor and positions of typical correction planes;

FIG. 8 is a detailed flow chart showing the steps of process of balancing in accordance with an embodiment of the invention;

FIG. 9 is a graph presented on the display device, showing respective combinations of the maximum values of the estimated residual vibration amplitudes the squares of the estimated residual vibration amplitudes corresponding to the respective correction plane position combinations; and FIG. 10 is a view similar to that in FIG. 6 but showing a modification of the embodiment of the present invention.

DETAILED DESCRIPTION OF THE PREFERRED EMBODIMENTS

Referring now to the drawings wherein like reference numerals are used throughout the various views to designate like parts and, more particularly, to FIG. 1, according to this figure, a rotor system of a power generating plant includes a first turbine rotor 1 rotatably supported by bearings 2 and 3, a second turbine rotor 4 rotatably supported by bearings 6 and 7 and connected to the first turbine rotor 1 through a coupling 5 and a generator rotor 8 rotatably supported by bearings 10 and 11 and connected to the second turbine rotor 4 through a coupling 9.

The present invention is directed to a technique for reducing the amplitude of excessive unbalance vibration occuring in each of the rotors 1, 4 and 8 shown in FIG. 1. More specifically, when each rotor 1, 4, 8 is proven to involve an excessive unbalance vibration, at least one of correction planes ($T1_1 \ldots T1_n$; $T2_1 \ldots T2_n$; $G_1 \ldots G_n$; and $J_1$–$J_4$) is selected or at least one of a plurality of combinations is selected each having at least any two of the correction planes. Then, a correction mass to be added is computed, based on the selected correction plane combination. Then, assuming that the computed correction mass is attached to the rotor, estimated residual vibrations and the root mean squares thereof are computed to respective correction plane position combinations each having at least any two of correction plane positions. According to the invention, the maximum value of the estimated residual vibration amplitudes and the root mean squares of the estimated vibration amplitudes are used as indices. Namely, the combination of the correction plane combination and the correction mass to be added to the rotor is judged as being an appropriate correction mass, when both of the maximum value of the estimated residual vibration amplitudes and the root mean of squares thereof are below a desired or allowable amplitude level. In actual, since a plurality of correction masses are obtained corresponding to the respective correction plane position combinations of the rotor, one of such correction masses which has the smallest vibration amplitude is selected and determined as an optimum correction mass, and the optimum correction mass is added to the rotor to reduce the unbalance vibration amplitude of the rotor.

As will be seen from FIG. 1, the balancing system in accordance with the embodiment of the invention includes sensors 21 to 26, respectively, associated with the bearings 2, 3, 6, 7, 10 and 11 to produce signals Sa upon sensing of the vibrations of these bearings, and a detector 27 associated with the free end of the first turbine rotor 1 and detecting the rotational speed of the first turbine rotor to generate a signal Sb. A vibration extracting device 28 has a vibration detector 29 and a vibration analyzer 30. The vibration detector 29 generates a vibration signal Sc in response to the signals from the sensors 21 through 26. The vibration analyzer 30 receives and analyzes the vibration signal Sc from the vibration detector 29 and the signal Sb from the detector 27 to extract the unbalance vibration component which is in synchronism with the rotational speed of the rotor, to thereby generate a signal Su representing the unbalance vibration component. The signal Sb from the detector 27 may be utilized as a phase reference signal for use in the extraction of unbalance vibration component through the analysis of the vibration signal Sc.

The signal Su from the vibration analyzer 30, representing the unbalance vibration component, is delivered to a judging device 31 which makes a judgement as to whether a desired or allowable level is exceeded by the unbalance vibration component. If the desired or allowable level is exceeded, the unbalance vibration signal is stored in a memory device 32 and fed to a computer 33. An operator who operates the computer 33 selects a suitable correction mass, and the computer 33 operates to compute an estimated vibration amplitude on an assumption that the selected correction mass is added to the rotor. An optimum correction mass is selected on the basis of the estimated vibration amplitude, in accordance with the following procedure. The operator manipulates a graphic terminal 34 and causes the same to designate, through the keyboard of the graphic terminal 34, a plurality of combinations of correction planes, each combination having at least two of correction planes for reducing the excessive unbalance vibration. Then, influence coefficients α preset to the respective correction plane combinations are searched out from a memory device 35. The computer 33 calculates correction masses respectively corresponding to the number of correction plane combinations, using the influence coefficients α. Then, on an assumption that the correction mass is added to the rotor, the computer calculates estimated residual vibration amplitudes and root mean squares thereof. The designation or selection of the correction plane combination, as well as the computations for the estimated residual vibration amplitudes and the root mean square thereof will be explained later. In the described embodiment of the invention, the residual vibration amplitudes at the critical speeds are used as the estimated residual vibration amplitudes. The "critical speeds" do mean the rotational speeds of the rotor at which the vibration amplitudes are peaked, as the rotational speed of the rotor is increased, as schematically shown by the solid line in FIG. 2. In FIG. 2, the vibration amplitude exhibits three peaks, i.e. three major maximum values. When the estimated residual vibration amplitude calculated on the assumption that the specific correction mass having a specific correction plane combination is added to the rotor takes the form of a curve shown by the broken line in FIG. 2, the vibration amplitude is reduced from A' to A at the first critical speed $K_1$. Similarly, the vibration amplitudes are reduced from B' to B and from C' to C, respectively, at the second critical speed $K_2$ and at the third critical speed $K_3$. The vibration amplitudes A, B and C are the estimated residual vibration amplitudes. The maximum one of the estimated residual vibration amplitude and the root mean squares of these amplitudes are used as the indices for the determination of the correction mass. In the estimated residual vibration curve shown in FIG. 2 by broken line curve, the amplitude B is the greatest of the three amplitudes. Therefore, the value of the amplitude B and the value expressed by $\sqrt{(A^2+B^2+C^2)/3}$ are used as the indices. On an assumption that the specific correction mass is added to the rotor, a judgement is made as to whether a desired or allowable level is exceeded by none of the estimated residual vibration amplitudes A, B and C. This judgement is made by monitoring the values of the amplitudes A, B and C with reference to the desired or allowable level all of which are displayed on a display device 36 (See FIG. 1). This method, however, permits the judgement for only one specific correction mass at a time. If a plurality of estimated results obtained on the assumption that a plurality of estimated masses comprising respective combinations of the correction plane combinations and the correction masses are added to the rotor are displayed on the display device 12, it will be extremely difficult to select the optimum correction mass from such a large number of results. If the number of residual vibrations is increased in excess of 3 (three), the display is further complicated to make the judgement and numeralization difficult. Accordingly, in the described embodiment of the invention, only two values, i.e. the maximum one B of three residual vibration amplitudes A, B and C and the root mean squares R of the amplitudes A, B and C, are displayed on the display device 36 as shown in FIG. 4, and the correction is judged to be acceptable if both of these two values are below the desired or allowable level. This display permits a plurality of estimated results obtained on the assumption that a plurality of correction masses are added to the rotor to be monitored at once and compared with each other for judgement.

Although the foregoing description has been made on an assumption that the correction plane combination includes at least two planes, it will be clear to those skilled in the art that the invention is applicable equally to the case where only one correction plane is available.

In the described embodiment of the invention, various computation results mentioned above are displayed on the display device 36, to permit the operator to select and determine the optimum correction mass. The computer 33 computes, in accordance with the instructions given by the graphic terminal 34, the estimated residual vibration amplitudes on the assumption that the selected optimum correction mass is added to the rotor, using the influence coefficient which is derived from the memory device 35 and which corresponds to the unbalance vibration signal Su introduced into the memory device 32 from the judging device 31. As shown in FIG. 5, rotational speed-vibration amplitude curves representing the computed estimated residual vibration amplitude (broken line) and the actually measured unbalance vibration amplitude (full line) based on the signal from the vibration anylizer 30, as well as the desired or allowable level (two-dot-and-dash line), are drawn on the same graph over the entire region of the rotational speed. Thus, the operator sufficiently confirms the effect of the selected and determined optimum correction mass, and thereafter, he actually adds the optimum correction mass to the rotor.

In FIG. 6, the unbalance vibration amplitude is detected by the vibration extraction device 31, and a judgement is made by the judging device 31 as to whether the desired or allowable level is exceeded by the actually measured vibration amplitude. If actually measured unbalance vibration amplitude is below the desired or allowable level, it is not necessary to take the labor of rotor balancing. However, if the desired or allowed level is exceeded, the operator selects a correction plane combination. The computer 33 computes, using the influence coefficient α corresponding to the selected correction plane combination and derived from the memory device 35, the correction mass, estimated residual vibration amplitudes εm and the root mean squares R thereof.

I. Selection of Correction Plane Combination

According to the invention, as stated before, a suitable correction mass is selected to reduce an excessive unbalance vibration amplitude, and estimated vibration amplitudes are computed on an assumption that the selected correction mass is added to the rotor. The correction mass has two factors, i.e. angle and magnitude. Therefore, as the first step, a suitable correction plane combination is selected from a plurality of correction plane combinations. By way of example, an explanation will be made hereinunder as to how the operator selects a correction plane combination for the rotor 8 (FIG. 1). The rotor 8 has a mass unbalance distributed in an optional manner along the length thereof. As the rotor having the mass unbalance is rotated and the rotational speed is increased to the rated speed, the vibration amplitude passes through a plurality of peaks where the vibration amplitude is peaked, as shown in FIG. 2. The vibration mode of the rotor 8 at the primary critical speed $K_1$ takes a primary mode shown in section (A) of FIG. 7 or a similar form. The vibration modes of the rotor 8 at the secondary critical speed $K_2$ and third critical speed $K_3$ take, respectively, secondary mode and third mode or similar forms as shown in (B) and (C) sections of FIG. 7. In FIG. 7, a symbol $\bigcirc\!\!\!\!\!\!\downarrow$ represents the most representative equivalent unbalance distribution which excites the primary, secondary tertiary vibration modes. Therefore, in the rotor 8 having the primary to tertiary vibration modes between the zero speed and the rated speed, it is possible to reduce the excessive unbalance vibration amplitude, if a suitable correction mass is added to one of five (5) correction planes or to at least one of a plurality of correction plane combinations each having at least any two of these correction planes. The positions of these correction planes are indicated at $G_1$ to $G_5$ in FIG. 7. Then, the operator designates the correction plane combination in accordance with the following selective standard of correction plane combination:

(i) When the excessive unbalance vibration amplitude is observed only at the primary speed, the operator designates $_5C_1$ as the correction plane combination.

(ii) When the excessive unbalance vibration amplitude is observed only at the secondary critical speed, the operator designates $_5C_2$ as the correction plane combination.

(iii) When the excessive unbalance vibration amplitude is observed at the tertiary critical speed, the operator designates $_5C_3$ as the correction plane combination.

(iv) When the excessive unbalance vibration amplitude is observed at all speed up to the rated speed, the operator designates $$\sum_{l=1}^{5} {}_5C_l$$

as the correction plane combination.

Then, the balancing computation is performed for the respective balancing plane combinations, in accordance with the instructions (i) to (iv) made by the operator.

Principle of Calculation of Correction Mass and Residual Vibration Amplitude

Following the selection of the correction plane combination explained in the item I above, it is necessary to determine the correction mass to be added to the correction plane combination. After the determination of the correction mass, the residual vibration amplitudes are computed on an assumption that the correction mass is added to the rotor 8. Hereinunder, an explanation will be made as to the method of calculating the correction mass to be added and the residual vibration amplitudes upon an assumption that the correction mass is applied to the rotor 8.

The following symbols will be used for the simplification of explanation:

n: Number of mass added positions (n=1, ..., N);
l: Number of positions of vibration measurement (l=1, ..., L);
k: Number of rotor speeds at which vibration measurements are made. (k=1, ..., K) (As stated before, the speeds at which vibration amplitude measurement is made are the critical speeds.);
m: Number of vibration amplitude measurements (m=1, ..., M; M=K×L);
$a_{mn}$: influence coefficient;

Am: initial unbalance vibration amplitude, i.e. actually measured unbalance vibration amplitude
Wn: correction mass to be added; and
$\epsilon m$: residual vibration amplitude Then, the estimated residual vibration amplitudes, which are expected to be observed when the correction mass is attached to the rotor, are expressed by the following equation.

$$\epsilon m = Am + \sum_{n=1}^{N} a_{mn} \cdot Wn \quad (1)$$

$$(m = 1, \ldots, M)$$

By solving the simultaneous equation by substituting 0 for $\epsilon m$ in the state M=N in the above formula (1), it is possible to determine the optimum correction mass Wn which would nullify the residual vibration amplitude. However, when M is not equal to N, particularly when M takes a value greater than the value of N, it is not possible to directly determine the correction mass Wn from the formula (1). In such a case, it is necessary to adopt the principle of least square method. A performance function, therefore, is determined as follows.

$$J = \sum_{m=1}^{M} |\epsilon m|^2 \quad (2)$$

The correction mass Wn which minimizes the performance function J is the correction mass which is optimum under the given condition for computation. The following formula is obtained for computation of this correction mass.

$$\frac{\partial J}{\partial Wn} = 0 \quad (3)$$

$$(n = 1, \ldots, N)$$

Thus, the correction mass to be obtained is determined by solving the simultaneous equations (2) and (3). Then, the estimated residual vibration amplitude $\epsilon m$, upon an assumption that this correction mass is added to the rotor, are computed by introducing this value of correction mass into to the equation (1). Furthermore, the mean value of the estimated residual vibration amplitudes at all amplitude measuring positions within the vibration measuring speed range is determined in accordance with the following formula.

$$R = \sqrt{\frac{\sum_{m=1}^{M} |\epsilon m|^2}{M}} \quad (4)$$

The symbol R represents the root mean squares, used as an index for vibration amplitude reduction. This index is obtainable because the estimated residual vibration amplitude em and the number M are given, in the above formula (4).

III. Selection of Optimum Correction Plane Position Combination and Determination of Optimum Correction Mass Various computations are thus completed. An explanation will be made hereinunder as to the process of determination of the optimum correction plane position combination, with specific reference to FIG. 8.

As the judging device 31 judges that the desired or allowable level is exceeded by the actually measured vibration amplitude, the operator designates correction plane combinations necessary for the computation of the correction mass, in accordance with the process I stated before [step (a)]. Then, with respect to the correction plane combination the computer 33 (See FIG. 1) computes the correction mass Wn to be added, estimated residual vibration amplitudes εm and the root mean squares R of the estimated residual vibration amplitudes step [(b)]. Subsequently, the maximum values | εm | max and the root mean squares R thereof are displayed together with the desired or allowable level on the display device 36 (See FIG. 1) for the respective correction plane position combinations [step (c)].

FIG. 9 shows, by way of example, the maximum values | εm | max of the estimated residual vibration amplitudes | εm | and the root mean squares R of the estimated residual vibration amplitudes upon an assumption that a correction plane combination $_5C_2$ having two of five correction planes $G_1$ to $G_5$ for the excessive vibration amplitudes at the secondary vibration mode of the rotor 8 is selected. More specifically, in FIG. 9, the abscissa shows the number of the correction plane position combinations, while the ordinates represents the vibration amplitudes of | εm | max and R by white blank bar graph and hatched bar graph, respectively. By watching the display as shown in FIG. 9 put on the display device 36, the operator recognizes appropriate correction plane position combinations each having | εm | max and R which are below the desired or allowable level, and judges and selects the optimum correction plane position combination from such appropriate combinations. From FIG. 9, it is clearly understood that the correction plane position combinations ($G_1$, $G_4$) and ($G_1$, $G_5$) denoted by Nos. 3 and 4 are below the desired or allowable level, so that the operator can instantaneously pick up the appropriate correction plane position combinations from a plurality of correction plane position combinations which are below the desired or allowable level. Among these appropriate correction plane position combinations which are below the desired or allowable level, the operator selects the correction plane position combination which has the smallest amplitude, i.e. the combination denoted by No. 3 in the case of the representation shown in FIG. 9, as an optimum correction position plane combination.

Once the selection of the optimum correction plane position combination is selected, the correction mass has been already determined by the computation as stated before, and a combination of the optimum correction plane position combination and the optimum correction mass. This step of determining the optimum correction mass is indicated at (d) in FIG. 8.

Following the determination of the optimum correction mass, a step (e) shown in FIG. 8 is taken for confirming the balancing effect on an assumption that the optimum correction mass thus determined is added to the rotor. More specifically, the operator operates the graphic terminal 34 to cause the same to issue instructions so as to make the computer 33 perform the computation in accordance with the formula (1), making use of the influence coefficient α corresponding to the optimum correction mass and derived from the memory device 35 and the initial or actually measured unbalance vibration amplitude stored in the memory device 32, to thereby determine the residual vibration amplitude upon an assumption that the determined optimum correction mass is added to the rotor. The thus obtained estimated residual vibration amplitude, initial or actually measured vibration amplitude stored in the memory device 32 and the desired or allowable level are put on the same graph on the display device 36 as shown in FIG. 5, so that the operator can confirm the effect of the balancing by checking whether the estimated residual vibration amplitude is below the desired or allowable level. Finally, the operator determines the optimum correction mass for suppressing the excessive unbalance vibration of the rotor, by synthesizing the results of the preceding steps. This final step is indicated at (f) in FIG. 8.

In the described embodiment, the selection of the optimum correction plane position combination is made through the observation of both of the estimated maximum vibration amplitudes | εm | max and the root mean squares R of these amplitudes shown on a single bar graph. In the case where the desired or allowable level varies depending on the rotational speed or positions of measurement of vibration, it is possible to arrange such that a plurality of graphs are put on display simultaneously to show the values of the maximum vibration amplitudes | εm | max and values of the root mean squares R for all of the rotational speeds and vibration measuring positions. It is to be noted also that the bar graph used in the selection of the optimum correction plane position combination may be substituted by a representation in the form of a table or chart.

FIG. 10 is a view similar to that in FIG. 6 but showing a modification of the described embodiment. In the modification shown in FIG. 10, all of the steps (a) to (f) shown in FIG. 8 are performed by the computer 33. More specifically, when the judging device 31 judges that the desired or allowable level is exceeded by the actually measured vibration amplitude, the computer 33 compares the actually measured vibration amplitudes at respective predetermined rotational speed positions, to discriminate which one or ones of the actually measured vibration amplitudes is or are exceeding the desired or allowable level. Through this operation, the computer 33 selects one of the correction plane combinations $_5C_1$, $_5C_2$, $_5C_3$ and $$\sum_{l=1}^{5} {}_5C_l$$

stated in "I. Selection of Correction Plane Combination" mentioned before. Thus, the step (a) shown in FIG. 8 is performed automatically by the computer 33. The steps (b) and (c) in FIG. 8 are performed by the computer 33, similarly to the embodiment described previously. Then, the computer 33 judges which one or ones of the respective combinations of the maximum values of the residual variation amplitudes and the root mean squares R thereof at the correction plane position combinations respectively corresponding to the number 1 to 10 in FIG. 9 is or are below the desired or allowable level, and searches for a combination having the smallest amplitude among the combinations which are below the desired or allowable level. The combination is an optimum correction plane position combination. Then, the computer 33 performs the step (e) shown in FIG. 8. Finally, the computer 33 compares the estimated residual vibration amplitudes at the respective predetermined rotational speed positions, i.e. critical speed positions, on an assumption that the optimum correction mass is added to the rotor, with the desired or allowable levels respectively corresponding to the estimated residual vibration amplitudes to judge whether the estimated residual vibration amplitudes are below the desired or allowable levels respectively corresponding thereto. If the estimated residual vibration amplitudes are below the desired or allowable levels, the optimum correction mass is finally decided. Thus, the computer 33 performs the step (f) in FIG. 8 automatically.

In the embodiment and modification thereof described hereinbefore, the desired level may be equal to the allowable level or may be lower, i.e. severer, than the allowable level by, for example, 10%. The optimum correction mass may be determined through judging what percentage the vibration amplitude after the correction is reduced below the desired or allowable level. Furthermore, although the condition of judgement for the selection of the optimum correction plane positon combination includes only two factors, namely the estimated maximum vibration amplitudes and the root mean squares thereof, the invention does not exclude such a modification that the condition of judgement includes the correction mass to be added and the circumferential position to which the mass is to be attached, as additional factors.

As has been described, according to the embodiment and the modification thereof, estimated residual vibration amplitudes and the root mean squares thereof are computed for the respective correction plane position combinations on an assumption that a certain correction mass is attached to the rotor, and an optimum correction plane positon combination is determined by means of indices which are the maximum value of estimated residual vibration amplitudes and the root mean squares thereof at each correction plane position combination. Then, an optimum correction amount is determined through judging whether the correction mass, which is the combination of the correction plane position combination and the correction mass, is appropriate or not. According to the embodiment and modification thereof of the invention, therefore, it is possible to achieve the rotor balancing at higher efficiency and accuracy as compared with the conventional technique in which the correction mass is determined on the basis of experience and trial-and-error method. It is to be noted also that, since the described embodiment and modification enable the determination of the correction mass to be made numerically, it is possible to determine the correction mass quickly by using a computer. In addition, the balancing can be performed without any specific skill, because the various judgements can be made distinctively by means of numerals. Thus, according to the embodiment and modification of the invention, it is possible to promptly and easily determine the correction mass for reducing the excessive unbalance vibration amplitude without relying upon the experience of the operator. This advantageously contributes to the smooth and stable operation of rotary machines.

What is claimed is:

1. A rotor balancing method for reducing excessive amplitude of unbalanced vibration occuring in a rotor of a rotary machine, the method comprising the steps of:
   actually measuring an unbalance vibration amplitude of said rotor;
   judging whether a desired level is exceeded by the actually measured unbalance vibration amplitude;
   selecting at least one of a plurality of correction plane combinations each having at least any two of the correction planes preset on said rotor, based on said actually measured vibration amplitude, when said desired level is exceeded by said actually measured unbalance vibration amplitude;
   computing a correction mass to be added to said rotor, using one of a plurality of influence coefficients preset to the respective correction plane combinations, corresponding to said at least one selected correction plane combination;
   computing on an assumption that said correction mass is added to said rotor, estimated residual vibration amplitudes and root mean squares of said estimated residual vibration amplitude;
   comparing combinations of maximum values of said estimated residual vibration amplitudes and said root mean squares of said estimated residual vibration amplitudes corresponding respectively to correction plane position combinations with said desired level; and
   selecting an appropriate correction plane position combination corresponding to at least one of said combinations of the maximum values and the root mean squares of said estimated residual vibration amplitudes which is below said desired level, the step of selecting said correction plane position combination includes selecting an optimum correction plane position combination corresponding to one of at least two combinations of the maximum value and the root means squares which has the minimum amplitude, so that an optimum correction mass is formed by said optimum correction plane position combination ans said correction mass; and
   attaching said correction mass to said rotor.

2. A rotor balancing method according to claim 1, wherein said optimum correction plane position combination is selected manually by an operator.

3. A rotor balancing method according to claim 1, wherein said optimum correction plane position combination is selected automatically by a computer.

4. A rotor balancing method according to one of claims 2 or 3, further comprising the steps of:
   comparing the estimated unbalance vibration amplitude upon an assumption that said optimum correction mass is applied to said rotor, with said desired level to judge whether the estimated unbalance vibration amplitude is lower than said desired level.

5. A rotor balancing mehtod according to claim 4, wherein, in the step of comparing the estimated unbalance, vibration amplitude is compared with said actually measured unbalance vibration amplitude and said desired level, and said optimum correction mass is determined as being the true optimum correction mass when said estimated unbalance vibration amplitude is below said desired level.

6. A rotor balancing method according to claim 5, wherein the selection of said correction plane combination is performed, based on at least one of critical speeds and rated speed of said actually measured unbalance vibration amplitude which exceeds said desired level.

7. A rotor balancing method according to claim 6, wherein said optimum correction plane position combination is selected manually by means of an operator.

8. A rotor balancing method according to claim 6, wherein said optimum correction plane position combination is selected manually by means of an operator.

9. A rotor balancing system for reducing excessive amplitude of unbalance vibration occuring in a rotor of a rotary machine comprising:

measuring means for actually measuring the unbalance vibration amplitude of said rotor;

judging means for judging whether the actually measured unbalance vibration amplitude exceeds a desired level;

first selection means for selecting, when said desired level is exceeded, at least one of a plurality of correction planes preset on said rotor, based on the actually measured unbalance vibration amplitude, said first selection means selects, when the actually measured unbalance vibration amplitude exceeds said desired level, at least one of a plurality of correction plane combinations each having at least any two of the correction planes preset on said rotor, based on the actually measured unbalance vibration amplitude;

first computing means for computing a correction mass to be added to said rotor, using one of a plurality of influence coefficients preset to respective correction planes, corresponding to said at least one selected correction plane, said first computing means computes the correction mass to be added to said rotor, using one of the influence coefficients respectively preset to said correction plane combinations, corresponding to said selected correction plane combination;

second computing means for computing, on an assumption that said correction mass is added to said rotor, estimated residual vibration amplitudes and the root means squares of said estimated residual vibration amplitudes; and second selection means for comparing respective combinations of maximum values of said estimated residual vibration amplitudes and said root means squares of said estimated residual vibration amplitudes corresponding to the respective correction planes with said desired level, to select, as an appropriate correction plane, the correction plane corresponding to at least one of said combinations which is below said desired level, said second selection means compares with said desired level respective combinations of the maximum values of said estimated residual vibration amplitudes and the root means squares of said estimated residual vibration amplitudes respectively corresponding to correction plane position combinations to select, as an appropriate correction plane position combination, the correction plane position combination which corresponds to at least two of said combinations of the maximum value and root means squares which are below said desired level and to select, as an optimum correction plane position combination, the correction plane position combination corresponding to one of said at least two combinations of the maximum values and the root means squares which has the minimum amplitude, said second selection means includes a first display device which displays the respective combinations of the maximum values of said estimated residual vibration amplitudes and said root means squares of said estimated resilient vibration amplitudes corresponding respectively to said correction plane position combinations together with said desired level, said optimum correction plane position combination being visually selected among said combinations of the maximum values and the root means squares which are displayed on said first display device.

10. A rotor balancing system for reducing excessive amplitude of unbalance vibration occuring in a rotor of a rotary machine comprising:

measuring means for actually measuring the unbalance vibration amplitude of said rotor;

judging means for judging whether the actually measured unbalance vibration amplitude exceeds a desired level;

first selection means for selecting, when said desired level is exceeded, at least one of a plurality of correction planes preset on said rotor, based on the actually measured unbalance vibration amplitude, said first selection means selects, when the actually measured unbalance vibration amplitude exceeds said desired level, at least one of a plurality of correction plane combinations each having at least any two of the correction planes preset on said rotor, based on the actually measured unbalance vibration amplitude;

first computing means for computing a correction mass to be added to said rotor, using one of a plurality of influence coefficients preset to respective correction planes, corresponding to said at least one selected correction plane, said first computing means computes the correction mass to be added to said rotor, using one of the influence coefficients respectively preset to said correction plane combinations, corresponding to said selected correction plane combination;

second computing means for computing, on an assumption that said correction mass is added to said rotor, estimated residual vibration amplitudes and the root means squares of said estimated residual vibration amplitudes; and second selection means for comparing respective combinations of maximum values of said estimated residual vibration amplitudes and said root means squares of said estimated residual vibration amplitudes corresponding to the respective correction planes with said desired level, to select, as an appropriate correction plane, the correction plane corresponding to at least one of said combinations which is below said desired level, said second selection means compares with said desired level respective combinations of the maximum values of said estimated residual vibration amplitudes and the root means squares of said estimated residual vibration amplitudes respectively corresponding to correction plane position combinations to select, as an appropriate correction plane position combination, the correction plane position combination which corresponds to at least two of said combinations of the maximum value and root means squares which are below said desired level and to select, as an optimum correction plane position combination, the correction plane position combination corresponding to one of said at least two combinations of the maximum values and the root means squares which has the minimum amplitude, said second selection means includes a computer which automatically selects said optimum correction plane position combination among the respective combinations of the maximum values of said estimated residual vibration amplitudes and the root means square of the estimated residual vibration amplitudes, based on a condition that said optimum correction plane position combination is below said desired level and has the smallest amplitude.

11. A rotor balancing system according to claim 9 or 10, wherein said first selection means selects said correction plane combination, based on at least one of critical speeds and rated speed of said actually measured unbalance amplitude which exceeds said desired level.

12. A rotor balancing system according to claim 11, further comprising:
deciding means for comparing said estimated unbalance vibration amplitude with said actually measured unbalance vibration amplitude and said desired level to decide a combination of said optimum correction plane position combination and said optimum correction mass when said estimated residual unbalance vibration amplitude is below said desired level.

13. A rotor balancing system according to claim 12, wherein said first selection means includes a second display device for displaying said actually measured unbalance vibration amplitudes and said desired level, said correction plane combination being selected by a visual check of an operator, based on said at least one of said critical speeds and rated speed of said actually measured unblance vibration amplitude displayed on said second display device, which exceeds said desired level.

14. A rotor balancing system according to claim 12, wherein said first selection means includes a computer which selects said correction plane combination based on a condition as to which of said critical speeds and rated speed of said actually measured unbalance vibration amplitude exceeds said desired level.

15. A rotor balance system according to claim 14, further comprising:
a memory device for storing the influence coefficients respectively preset to said correction plane combinations; and
said first and second selection means and said first and second computing means being constituted by a single computer unit.

16. A rotor balancing system according to claim 14, wherein said means for actually measuring the unbalance vibration amplitude of said rotor includes:
rotational speed detecting means for detecting the rotational speed of said rotor to produce a signal;
a vibration detector for detecting the vibration amplitude of said rotor to produce a signal; and
a vibration analyzer operative in response to the signal from said rotational speed detector and the signal from said vibration detector, to produce an unbalance vibration component signal synchronous with the rotational speed of said rotor;
said judging means judging whether said actually measured unbalance vibration of said rotor exceeds said desired level, based on said unbalance vibration component signal.

* * * * *